US011263642B2

(12) United States Patent
Sica et al.

(10) Patent No.: US 11,263,642 B2
(45) Date of Patent: Mar. 1, 2022

(54) ENSURING COMPLIANCE IN ON-PREMISE COMPUTE MODELS

(71) Applicant: INTERNATIONAL BUSINESS MACHINES CORPORATION, Armonk, NY (US)

(72) Inventors: Andrew M. Sica, New Haven, CT (US); Charles E. Hackett, Greenlawn, NY (US); Daniel Nieves, Poughkeepsie, NY (US); Christopher Chappell, Poughkeepsie, NY (US); Edward A. King, Poughkeepsie, NY (US); Dominic Schroeder, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 16/270,835

(22) Filed: Feb. 8, 2019

(65) Prior Publication Data

US 2020/0258092 A1  Aug. 13, 2020

(51) Int. Cl.
*G06Q 30/00* (2012.01)
*G06Q 30/02* (2012.01)

(52) U.S. Cl.
CPC ....... *G06Q 30/018* (2013.01); *G06Q 30/0206* (2013.01)

(58) Field of Classification Search
CPC ............. G06Q 30/018; G06Q 30/0206; G06Q 30/0202
See application file for complete search history.

(56) References Cited

U.S. PATENT DOCUMENTS

| 8,832,048 | B2* | 9/2014 | Lim ................... H04L 41/0893 707/694 |
| 9,342,357 | B2 | 5/2016 | Grueneberg |
| 9,699,213 | B2 | 7/2017 | Nagaratnam |
| 10,346,775 | B1* | 7/2019 | Xu ................... G06Q 10/06315 |
| 10,374,909 | B2* | 8/2019 | Kawai .................... G06Q 10/10 |
| 10,673,952 | B1* | 6/2020 | Cohen ..................... H04L 67/32 |
| 2002/0065780 | A1* | 5/2002 | Barritz ................. G06Q 50/188 705/59 |
| 2004/0095237 | A1* | 5/2004 | Chen ................... H02J 13/0086 340/506 |

(Continued)

OTHER PUBLICATIONS

The Recycler, HP launches new Instant Ink programme, Sep. 24, 2013, Online trade magazine, whole document (Year: 2013).*

(Continued)

*Primary Examiner* — Dylan C White
(74) *Attorney, Agent, or Firm* — Cantor Colburn LLP; Teddi Maranzano (57) ABSTRACT

A computer-implemented method includes monitoring, by an agent, resource consumption at a system running at an on-premises data center, where the agent is embedded into the system. Compliance data is determined by measuring, by the agent, the resource consumption according to one or more cost factors of a consumption-based pricing agreement. The compliance data is useable to determine a consumption-based price of operating the system according to the consumption-based pricing agreement.

14 Claims, 3 Drawing Sheets

(56) References Cited

U.S. PATENT DOCUMENTS

| | | | | |
|---|---|---|---|---|
| 2006/0191994 A1* | 8/2006 | Steiger | ................... | G06Q 20/18 |
| | | | | 235/379 |
| 2010/0211509 A1* | 8/2010 | Jacobs | ................... | G06Q 50/06 |
| | | | | 705/302 |
| 2011/0145153 A1* | 6/2011 | Dawson | ................. | G06Q 10/10 |
| | | | | 705/80 |
| 2013/0080607 A1* | 3/2013 | Raleigh | ............ | G06Q 10/06315 |
| | | | | 709/221 |
| 2013/0103556 A1* | 4/2013 | Lyon | ....................... | H04L 47/70 |
| | | | | 705/34 |
| 2013/0198050 A1* | 8/2013 | Shroff | ................... | G06F 9/5072 |
| | | | | 705/34 |
| 2017/0041206 A1* | 2/2017 | Maes | ................. | H04L 41/5009 |
| 2017/0372384 A1* | 12/2017 | Yaros | ...................... | H04L 67/10 |
| 2018/0173866 A1* | 6/2018 | Williams | ................ | H04L 63/20 |
| 2019/0251575 A1* | 8/2019 | Berti | ....................... | G06F 16/27 |
| 2020/0314174 A1* | 10/2020 | Dailianas | ............ | G06F 9/45558 |
| 2020/0314175 A1* | 10/2020 | Dailianas | ............ | H04L 67/1023 |
| 2021/0084451 A1* | 3/2021 | Williams | ............... | G06Q 50/18 |

OTHER PUBLICATIONS

Stuart Deavall, How to fix_13 HP cartridges locked to another printer, Feb. 22, 2017, updated May 20, 2019, Toner Giant (Year: 2017).*

Wayback Machine (Jun. 30, 3017), Stuart Deavall, How to fix—HP cartridges locked to another printer, Feb. 22, 2017, updated May 18, 2017, Toner Giant (Year: 2017).*

* cited by examiner

ENSURING COMPLIANCE IN ON-PREMISE COMPUTE MODELS

BACKGROUND

The present invention relates to on-premise computing and, more specifically, to ensuring compliance in on-premise compute models.

It is common for a customer to run a mainframe on the customer's premises to provide a service through that mainframe to end users. In this case, all or a portion of the mainframe can be provided to the customer by a vendor, which charges the customer on a consumption basis. For example, the vendor can charge the customer based on memory utilization, central processing unit (CPU) utilization, CPU time consumed by the mainframe, amount of data captured, network activity, or other metrics.

SUMMARY

Embodiments of the present invention are directed to a computer-implemented method for determining compliance. A non-limiting example of the computer-implemented method includes monitoring, by an agent, resource consumption at a system running at an on-premises data center, where the agent is embedded into the system. Compliance data is determined by measuring, by the agent, the resource consumption according to one or more cost factors of a consumption-based pricing agreement. The compliance data is useable to determine a consumption-based price of operating the system according to the consumption-based pricing agreement.

Embodiments of the present invention are directed to a compliance system for determining compliance. A non-limiting example of the compliance system includes a system configured to provide a service to a plurality of end users, where the system is further configured to run at an on-premises data center. The compliance system further includes an agent embedded into the system, where the agent is configured to monitor resource consumption at the system and to determine compliance data by measuring the resource consumption according to one or more cost factors of a consumption-based pricing agreement. The compliance data is useable to determine a consumption-based price of operating the system according to the consumption-based pricing agreement.

Embodiments of the invention are directed to a computer-program product for determining compliance, the computer-program product including a computer-readable storage medium having program instructions embodied therewith. The program instructions are executable by a processor to cause the processor to perform a method. A non-limiting example of the method includes monitoring, by an agent, resource consumption at a system running at an on-premises data center, where the agent is embedded into the system. Further according to the method, compliance data is determined by measuring, by the agent, the resource consumption according to one or more cost factors of a consumption-based pricing agreement. The compliance data is useable to determine a consumption-based price of operating the system according to the consumption-based pricing agreement.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, conventionally, consumption-based cost models for on-premise cloud or cloud-like compute deployments are flawed in their measuring capabilities related to determining actual consumption. To measure consumption of a mainframe, the customer is conventionally provided with a measurement tool. The customer is obligated to run the measurement tool from time to time, and the tool generates a report summarizing applicable consumption metrics. The customer transmits the report to the vendor, and as such, the vendor can charge the customer based on consumption. However, this conventional measurement tool is flawed in that it is under the control of the customer. As a result, the customer can tamper with the measurement tool or interfere with its measurement-taking to provide false reporting, resulting in an apparent reduction in charges due to the vendor.

Turning now to an overview of the aspects of the invention, one or more embodiments of the invention address the above-described shortcomings of the prior art by providing a mechanism to more effectively ensure compliance through measuring consumption in an on-premises computing environment, such as a mainframe. According to some embodiments, an agent is deployed on the customer's mainframe in a manner that resists tampering. For instance, the agent may be implemented in hardware of the mainframe or may be coded into the operating system of the mainframe. The agent may monitor resource consumption at the mainframe to measure cost factors, as well as compliance with software licensing, and may communicate determined information to the vendor, either directly or indirectly.

The above-described aspects of the invention address the shortcomings of the prior art by providing an effective, tamper-resistant mechanism for ensuring compliance with a customer's terms with a vendor. Through the use of an agent built into a mainframe, the customer is unable to miscommunicate compliance-relevant information, and vendors can ensure accurate data and billing. Conventional approaches deal with off-premise or hosted environments, and existing on-premise compliance tools provide only for specific software products or appliances. Embodiments of the invention, however, provide for compliance in the form of a complete on-premise solution, covering hardware and software.

Figure 1:
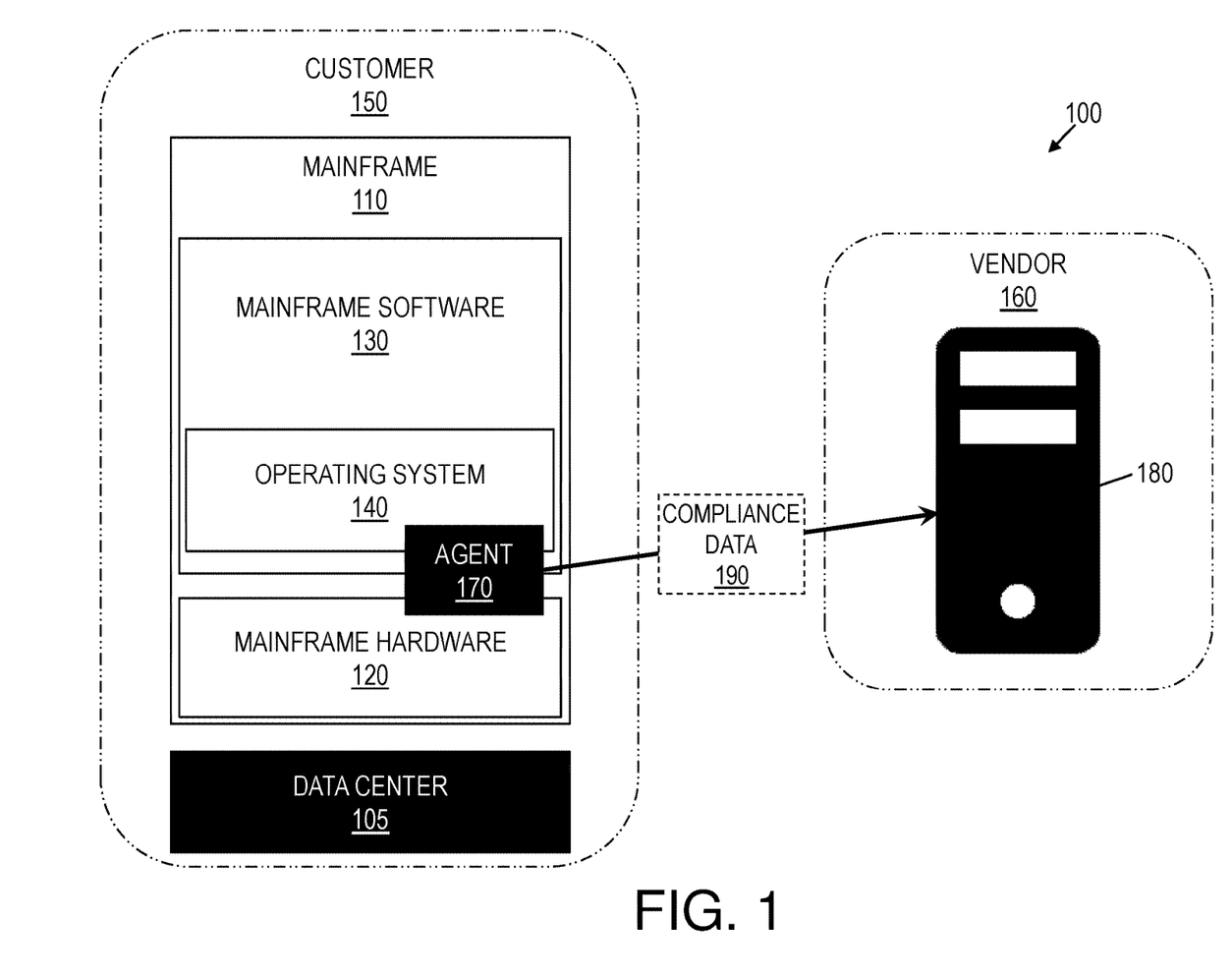
FIG. 1 is a block diagram of a compliance system according to some embodiments of the invention.

Turning now to a more detailed description of aspects of the present invention, FIG. 1 is a block diagram of a compliance system 100 according to some embodiments of the invention. As shown in FIG. 1, the compliance system 100 may include, or may be integrated with, a mainframe 110 with both mainframe hardware 120 and mainframe software 130, where that mainframe software 130 includes an operating system 140. In some embodiments of the invention, the mainframe 110 is located on the premises of a customer 150 and is supported, or provided by, a vendor 160. For instance, the customer 150 may run the mainframe 110 at the customer's data center 105. From the customer's premises, the mainframe 110 may provide a service, such as a cloud service, to end users. For example, and not by way of limitation, the mainframe 110 may be an IBM® z Systems® mainframe. Further, at least a portion of the mainframe hardware 120 or the mainframe software 130, or both, may be provided by the vendor 160 as part of its agreement with the customer 150. For instance, the cost of software licenses, hardware, or services, or a combination of these, is based on system metrics.

As further shown in FIG. 1, an agent 170 may be deployed on the mainframe 110, and the agent 170 may be communication with a server 180 located remotely from the mainframe 110. Specifically, in some embodiments of the invention, the agent 170 may be configured to transmit compliance data 190 to the server 180 from time to time, such as on a periodic basis. The agent 170 may include mainframe hardware 120, mainframe software 130, or a combination of both. For example, and not by way of limitation, the agent 170 may be a specialized hardware circuit integrated with, or otherwise installed on, the mainframe hardware 120, or the agent may be coded as part of the operating system 140 of the mainframe 110. In some embodiments of the invention, the agent 170 is embedded in the mainframe 110 and is thus a part of the mainframe 110, rather than a separate installation. In this manner, the agent 170 may be designed for tamper-resistance, such that disabling or uninstalling the agent 170 may disable the mainframe 110 or cause an alert to be transmitted to the server 180.

The agent 170 may monitor operations at the mainframe 110 and may, thereby, measure consumption of resources relevant to an applicable consumption-based agreement between the customer 150 and the vendor 160. Such resource consumption being monitored and measured may include, for example, and not by way of limitation: memory utilization, CPU utilization, CPU time consumed by the mainframe 110, amount of data captured, processor cycles used by a component of mainframe software 130, processor cycles used by a component of mainframe hardware 120, and network activity.

The agent 170 may perform monitoring tasks in various ways. For example, and not by way of limitation, the agent 170 may monitor a registry of the mainframe 110, where hardware and software components of the mainframe 110 register with the registry upon use. For another example, the agent 170 may have access to network interfaces of the mainframe 110 and may thereby monitor network traffic. For another example, some or all hardware or software components, or products, of the mainframe 110 that are subject to monitoring may be configured to directly report usage to the agent 170. For yet another example, the agent 170 may monitor or periodically examine a control block or storage area of the mainframe 110. It will be understood by those skilled in the art that various other mechanisms exist for monitoring consumption for the purpose of measuring consumption, and one or more of such mechanisms may be used by the agent 170. Further, in some cases, the mainframe 110 may be provided to the customer 150 with more hardware or software than the customer 150 requires. Thus, additionally or alternative to determining consumption, the agent 170 may determine which mainframe hardware 120 and which mainframe software 130 is being used and at what level of consumption.

Generally, the server 180 may be in communication with the agent 170 to receive compliance data 190 about compliance of the mainframe. In some embodiments of the invention, the server 180 may be operated or managed by the vendor 160, or the vendor 160 may otherwise have access to compliance data 190 on the server 180. This compliance data 190 may include, for example, consumption metrics and data related to whether the mainframe is complying with licenses, as described further below. For example, and not by way of limitation, the server 180 may be a webserver configured to gather compliance data 190 from agents 170 of one or more mainframes 110 of one or more customers 150. The compliance data 190 provided by the agent 170 may be utilized as part of a standard, required reporting mechanism, by which the vendor 160 can access the compliance data 190 and charge the customer 150 accurately or, in the case of non-compliance with licenses or other agreements, take remedial action.

In some embodiments of the invention, additionally or alternatively to measuring consumption, the agent 170 may ensure compliance with software licensing or other requirements to which the mainframe 110 is subject. There exist a variety of compliance checks that could be performed, and it will be understood that the specific compliance checks performed or facilitated by the agent 170 may depend on the specific terms and conditions of the agreement between the customer 150 and the vendor 160. That agreement may be, for instance, a hardware, software, or maintenance agreement, or a combination thereof. For example, and not by way of limitation, the customer 150 may purchase, or may have purchased, value units or entitlements providing access to amounts of certain resources for a given period time, and the agent 170 may therefore facilitate tracking the usage of such value units or entitlements.

For example, and not by way of limitation, compliance checks facilitated by the agent 170 based on compliance data 190 gathered by the agent 170 may include the following: validating that installed products (e.g., mainframe hardware 120 or mainframe software 130) are licensed or are licensed to the appropriate requirement level; validating that software or operating-system utilities utilized for metering costs are functional and running; validating that no third-party tool, program, or other utility is tampering with data relating to consumption-based costs; and ensuring that restricted-use or limited-use mainframe hardware 120 or mainframe software 130 is being utilized only within the agreed-upon environment and conditions. To this end, for example, the agent 170 may monitor various products of the mainframe hardware 120 or the mainframe software 130 to determine how these components are being used. Additionally or alternatively, the agent 170 may check software licenses, such as by communicating serial numbers found in the registry to third-party servers associated with the software licenses, to ensure that the mainframe 110 is fully in compliance with such licenses.

As mentioned above, the agent 170 may gather compliance data 190, which may include or indicate one or more of the following: consumption metrics, indications of which hardware is in use, indications of which software is in use, and indications of compliance with hardware or software licenses. This compliance data 190 may be transmitted by the agent 170 to the server 180. In some embodiments of the invention, the agent 170 may summarize the information gathered as described above and may, therefore, report the compliance data 190 in the form of a summary. Summarization may reduce network traffic between the agent 170 and the server 180 and may reduce the amount of compliance data 190 being handled by the server 180.

Figure 2:
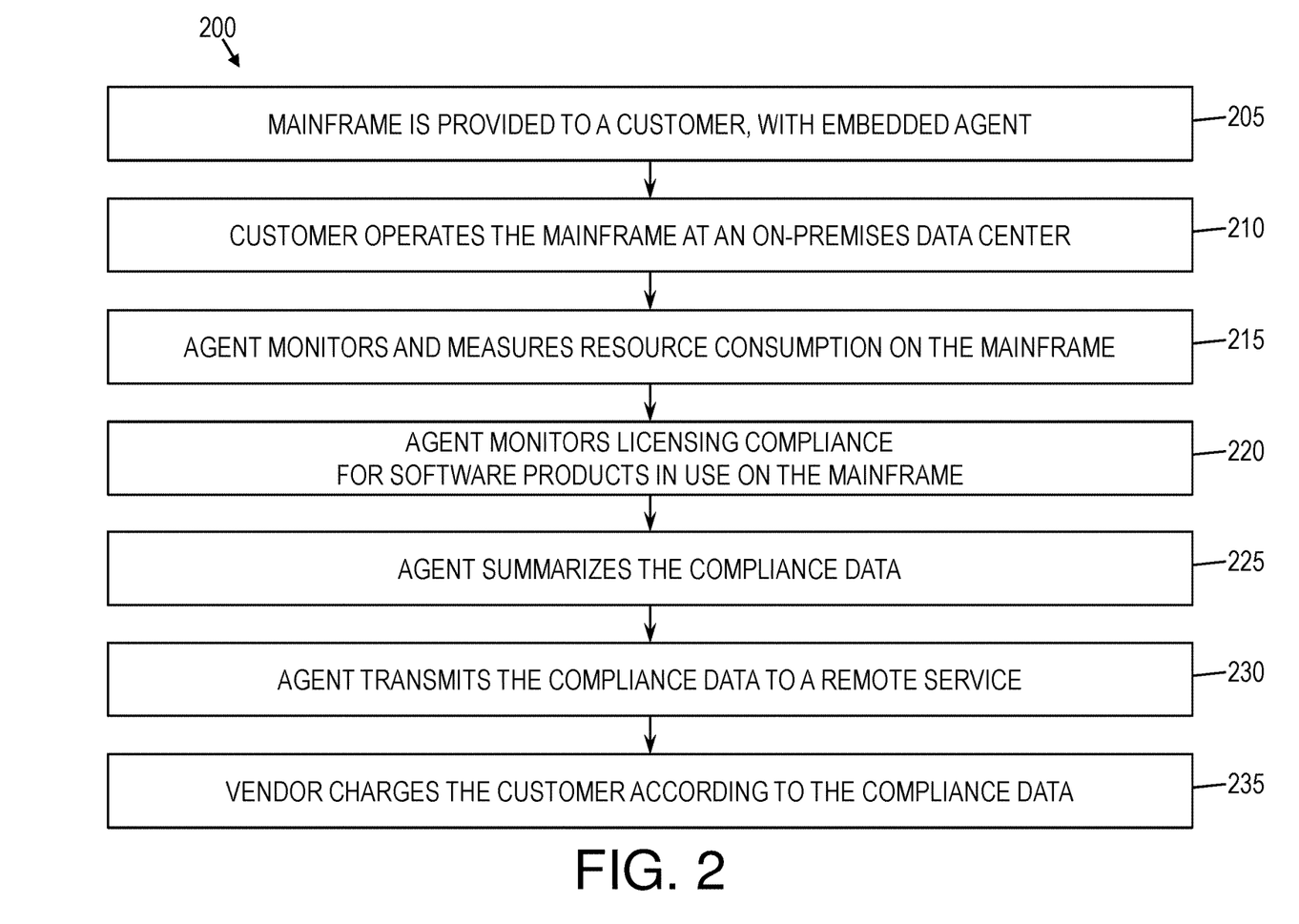
FIG. 2 is a flow diagram of a method of ensuring compliance of an on-premise computing system, according to some embodiments of the invention.

FIG. 2 is a flow diagram of a method 200 of ensuring compliance of an on-premise computing system, according to some embodiments of the invention. As shown, at block 205, a mainframe 110 is provided to a customer 150 with an agent 170, as described herein, already embedded within the mainframe 110. At block 210, the customer 150 operates the mainframe 110, such as at an on-premises data center 105. For instance, with the mainframe 110, the customer 150 may provide a service to end users.

At block 215, during operation of the mainframe 110, the agent 170 may monitor and measure consumption according to a set of guidelines, such as a set of preestablished metrics. In some embodiments of the invention, the agent 170 may be updated from time to time, such as through updates to the operating system 140 or other critical aspect of the mainframe 110. Such an update may be pushed to the mainframe 110 from the vendor 160, for example. Through such an update, the metrics or other guidelines being used to monitor consumption and other compliance-related information may be updated, such that the agent's behavior changes after the update. As a result, if the agreement between the customer 150 and the vendor 160 changes, such that the monitoring by the agent 170 must change to capture appropriate compliance data 190 for ensuring compliance with applicable agreements, the agent 170 is enabled to be updated as needed. Measurements determined by the agent 170 may be stored in compliance data 190.

At block 220, during operation of the mainframe 110, the agent 170 may monitor licensing compliance for products, such as mainframe software 130 and mainframe hardware 120, on the mainframe 110. To this end, for example, the agent 170 may check one or more registries, control blocks, or storage areas or may communicate with third-party servers to confirm license statuses, as needed. Information determined relevant to compliance of such products may be stored in the compliance data 190.

At block 225, the agent 170 may summarize the compliance data 190, and at block 230, the agent 170 may transmit the summarized version of the compliance data 190 to a remote server 180.

At block 235, the vendor 160 may receive the compliance data 190 and may charge the customer 150 accordingly. If the vendor 160 determines, based on the compliance data 190, that any licenses are not being complied with, the vendor 160 may take remedial action, such as notifying the customer 150 of the non-compliance.

Thus, as described above, some embodiments of the compliance system 100 offers a system-based agent 170 that collects resource-consumption data produced by hardware or software services, monitors the availability of critical system services to provide metrics used to determine vendor costs, and monitors compliance for individual software product usage and licensing. Thus, an advantage of the compliance system 100 is the provision of a complete compliance solution for on-premise deployments, including cloud deployments, and full platform models.

Figure 3:
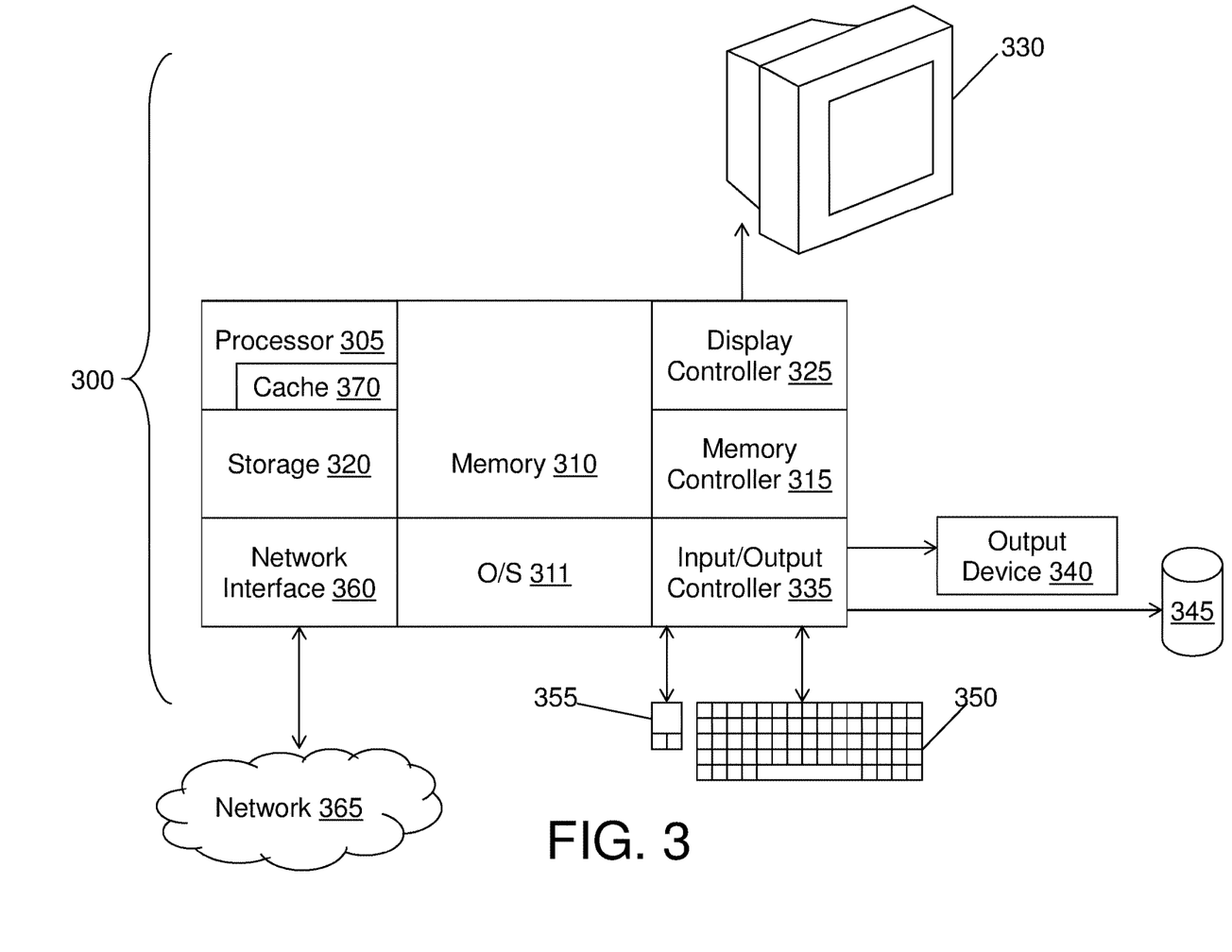
FIG. 3 is a block diagram of a computer system for implementing some or all aspects of the compliance system, according to some embodiments of this invention.

FIG. 3 is a block diagram of a computer system 300 for implementing some or all aspects of the compliance system 100, according to some embodiments of this invention. The compliance systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the mainframe 110 may be a computer system 300, or the mainframe 110 may operate at a data center 105, which may be a computer system 300 or portion thereof.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a CPU, an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the compliance systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Compliance systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
monitoring, by an agent, resource consumption of a client at a system running at an on-premises data center of the client, wherein the agent is embedded into the system as one of a specialized hardware circuit integrated with the system and software coded as an integrated portion of an operating system of the system for tamper-resistance such that disabling or uninstalling the agent will disable the system;
determining compliance data by measuring, by the agent, the resource consumption according to one or more cost factors of a consumption-based pricing agreement; and
reporting, by the agent, the compliance data of the client to a remote vendor system;
wherein the compliance data is useable to determine a consumption-based price of operating the system according to the consumption-based pricing agreement.

2. The computer-implemented method of claim 1, further comprising transmitting the compliance data to a webserver remote from the system.

3. The computer-implemented method of claim 1, further comprising determining whether the system complies with one or more software licenses of one or more software products installed on the system.

4. The computer-implemented method of claim 1, wherein the monitoring, by the agent, resource consumption at the system comprises monitoring, by the agent, at least one of a control block and a storage area on the system.

5. The computer-implemented method of claim 1, wherein the system provides a cloud service to a plurality of end users.

6. A compliance system comprising:
a system configured to provide a service to a plurality of end users, wherein the system is further configured to run at an on-premises data center of a client;
an agent embedded into the system as one of a specialized hardware circuit integrated with the system and software coded as an integrated portion of an operating system of the system for tamper-resistance such that disabling or uninstalling the agent will disable the system, wherein the agent is configured to:
monitor resource consumption of the client at the system;
determine compliance data by measuring the resource consumption according to one or more cost factors of a consumption-based pricing agreement; and
report the compliance data of the client to a remote vendor system;
wherein the compliance data is useable to determine a consumption-based price of operating the system according to the consumption-based pricing agreement.

7. The compliance system of claim 6, wherein the agent is further configured to transmit the compliance data to a webserver remote from the system.

8. The compliance system of claim 6, wherein the agent is further configured to determine whether the system complies with one or more software licenses of one or more software products installed on the system.

9. The compliance system of claim 6, wherein the monitoring, by the agent, resource consumption at the system comprises monitoring, by the agent, at least one of a control block and a storage area on the system.

10. A computer-program product for determining compliance, the computer-program product comprising a computer-readable storage medium having program instructions embodied therewith, the program instructions executable by a processor to cause the processor to perform a method comprising:
monitoring, by an agent, resource consumption of a client at a system running at an on-premises data center of the client, wherein the agent is embedded into the system as one of a specialized hardware circuit integrated with the system and software coded as an integrated portion of an operating system of the system for tamper-resistance such that disabling or uninstalling the agent will disable the system;
determining compliance data by measuring, by the agent, the resource consumption according to one or more cost factors of a consumption-based pricing agreement; and
reporting, by the agent, the compliance data of the client to a remote vendor system;
wherein the compliance data is useable to determine a consumption-based price of operating the system according to the consumption-based pricing agreement.

11. The computer-program product of claim 10, the method further comprising transmitting the compliance data to a webserver remote from the system.

12. The computer-program product of claim 10, the method further comprising determining whether the system complies with one or more software licenses of one or more software products installed on the system.

13. The computer-program product of claim 10, wherein the monitoring, by the agent, resource consumption at the system comprises monitoring, by the agent, at least one of a control block and a storage area on the system.

14. The computer-program product of claim 10, wherein the system provides a cloud service to a plurality of end users.

* * * * *